July 10, 1956   C. A. SPAULDING, JR., ET AL   2,754,263
TABLE TOP WATER SOFTENER Filed Dec. 24, 1952   3 Sheets-Sheet 1

INVENTORS
Charles. A. Spaulding. Jr.
Eugene Schmidt
by
Campbell Brumbaugh Free & Graves
their ATTORNEYS.

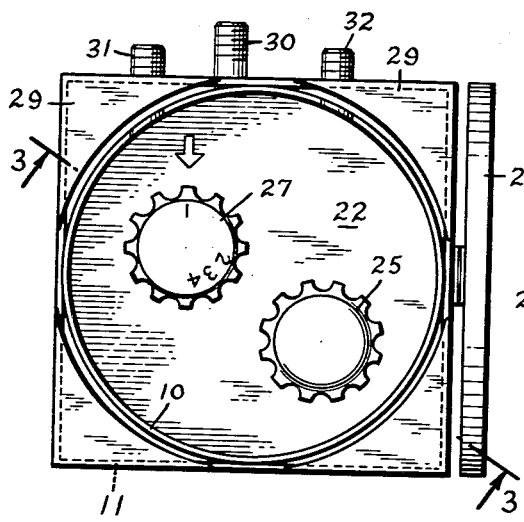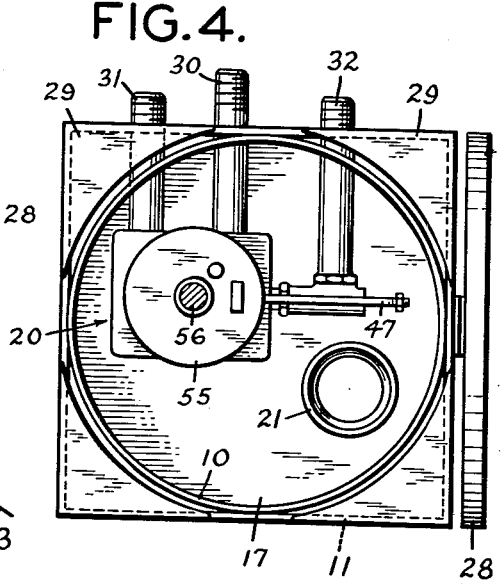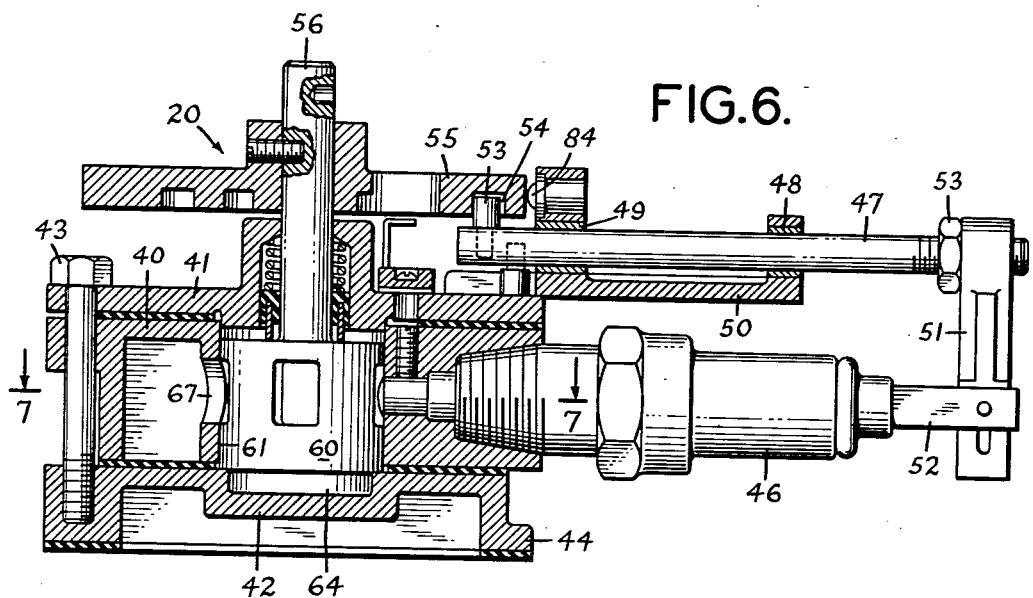

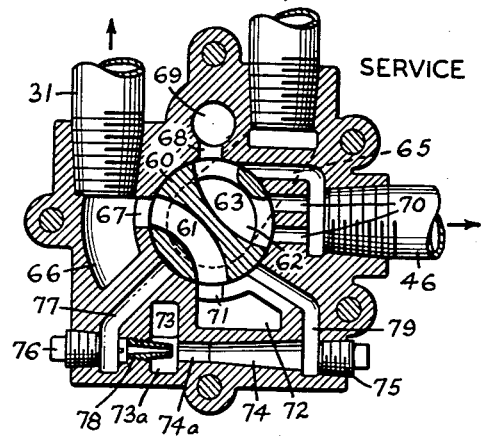
FIG.7. SERVICE
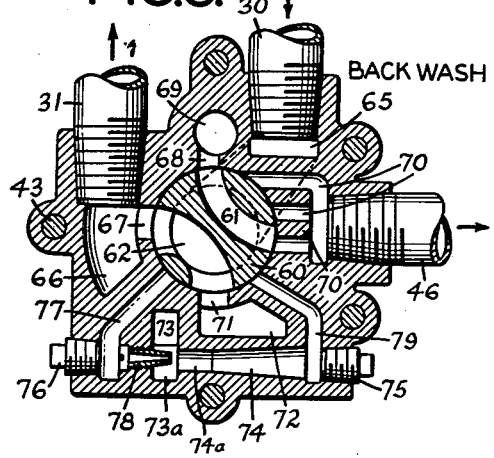
FIG.8. BACK WASH
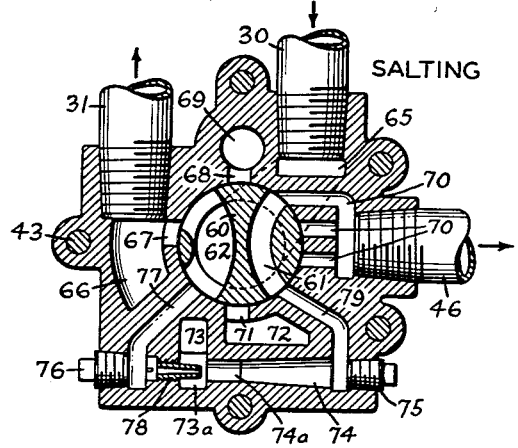
FIG.9. SALTING
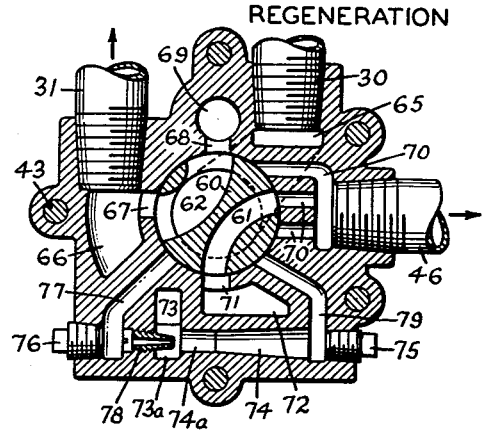
FIG.10. REGENERATION
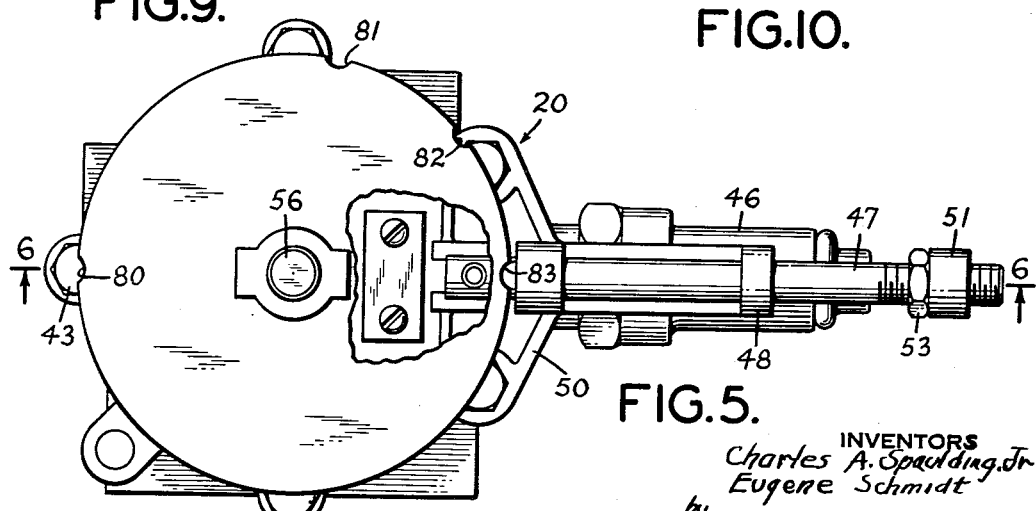
FIG.5.
INVENTORS
Charles A. Spaulding, Jr.
Eugene Schmidt
by Campbell, Brumbaugh, Free & Graves
their ATTORNEYS.

United States Patent Office 2,754,263
Patented July 10, 1956

2,754,263

TABLE TOP WATER SOFTENER

Charles A. Spaulding, Jr., and Eugene Schmidt, Omaha, Nebr., assignors to The Refinite Corporation, Omaha, Nebr., a corporation of Nebraska Application December 24, 1952, Serial No. 327,772

6 Claims. (Cl. 210—24)

This invention relates to water softening systems and it relates particularly to improvements in household water softeners.

Heretofore, the commercially available household water softeners have been of strictly utilitarian types for installation in the basements of houses. They usually include an elongated, upright tank of little decorative value to receive a bed of water softening reagent and a control valve which is exposed and accessible for operation by the householder to regenerate the water softening reagent.

In recent years, many houses have been built without basements and with utility rooms for heating equipment and the like at ground level. Usually, because of the compact nature of such houses, there is little space for the conventional type of water softener and when used, it has occupied, and made unusable for other purposes, space in the kitchen or the utility room without adding anything to the decor or utility of such rooms.

In accordance with the present invention a water softener has been provided which can be installed in a kitchen or utility room and is of such height and over-all appearance that it can be installed with other kitchen or washing equipment so as to be inconspicuous and to provide an unobsrtucted working surface at the same level as the cabinets, sink, dishwasher or other equipment in the kitchen or utility room. The new water softener embodying the present invention preferably is housed in a cabinet having a flat or unobstructed top which is at about table or cabinet top height, i. e. between 34 and 36 inches high, conforming to other standard cabinet sizes and in which the valve for controlling regeneration and the loading opening through which salt is added are concealed by the top, but, nevertheless, are readily accessible by raising the cover or lid of the cabinet in which the water softener is housed.

In order to make the control valve and loading opening accessible, and at the same time easily regulated by the householder, it is necessary to incorporate in the control system means whereby the softening reagent can readily be backwashed, water partially drained from the water softener tank to permit the addition of salt and the water flow reversed in order to regenerate the reagent before returning the system to service. Moreover, to enable the use of water in the house during the regeneration of the water softener, the control valve for the system has been constructed and arranged to make raw water available in the household water system during regeneration of the water softener.

The new water softener provides an attractive unit which occupies only a relatively small amount of floor space, but nevertheless does not waste this space because it has a working surface at table top height. It can be provided with cabinets of different size, shape and color so that it can be installed with and match other equipment in the kitchen or utility room.

For a better understanding of the present invention, reference may be had to the accompanying drawings in which:

Fig. 2 is a plan view of the water softener with its lid or cover shown in a raised position;

Fig. 4 is a top view of the water softener with parts removed and in section to disclose the control valve for the water softener;

Fig. 5 is a plan view of the control valve for the water softening system removed from the water softener;

Fig. 6 is a view in section taken on line 6—6 of Fig. 5;

Fig. 7 is a view in section taken on line 7—7 of Fig. 6 showing the control valve in a position to place the water softener in service;

Fig. 8 is a view in section similar to Fig. 7 showing the valve in the position for backwashing the water softening reagent;

Fig. 9 is a view in section similar to Fig. 7 showing the valve in its adjusted position for introduction of salt into the water softener; and Fig. 10 is a view in section similar to Fig. 7 showing the valve adjusted for regenerating the water softening reagent.

Figure 1:
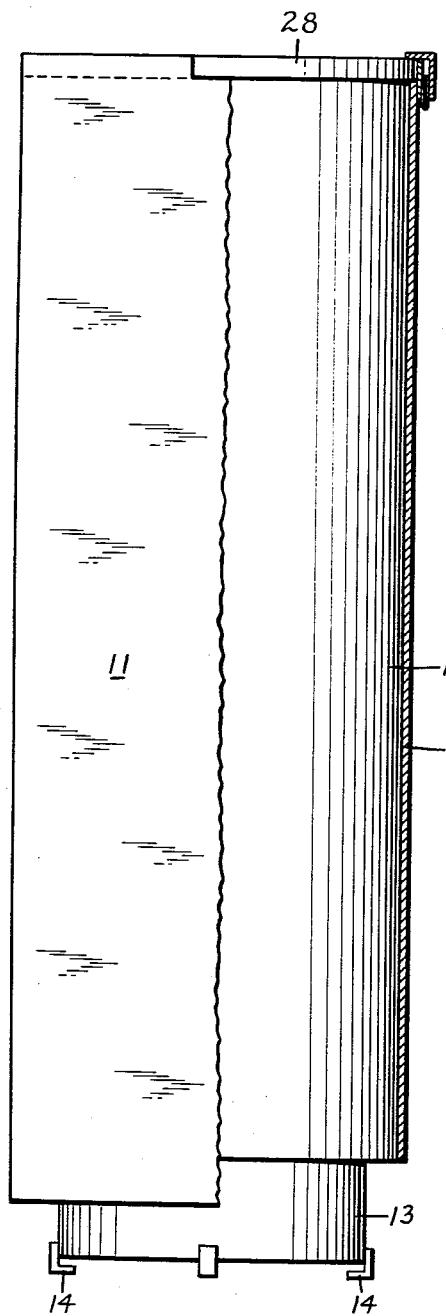
Fig. 1 is a view in front elevation of a typical water softener embodying the present invention.
Figure 3:
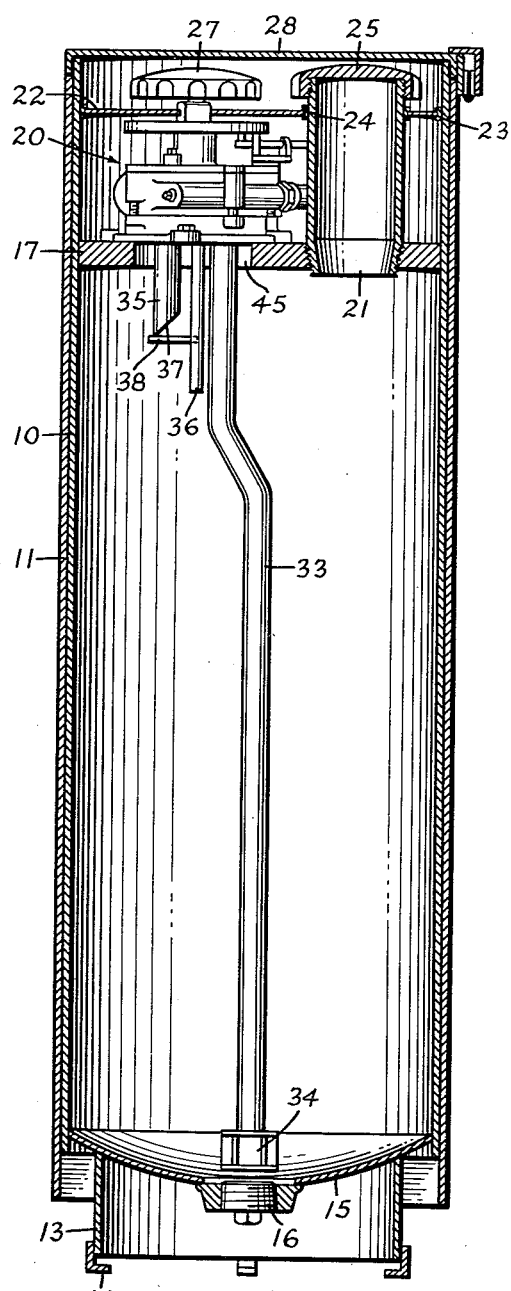
Fig. 3 is a view in longitudinal section taken on line 3—3 of Fig. 2.

The water softening unit described herein is typical of water softeners embodying the present invention and is illustrated as a unit of about 36 inches over-all height and including an upright cylindrical tank 10 of about 11 or 12 inches internal diameter. It will be understood, of course, that the diameter of the tank may be modified depending upon the volume of water used in the household and that it may be of smaller or larger internal diameter depending upon requirements. As illustrated, the tank 10 is housed in a generally square casing or cabinet 11 which, as shown, fits tightly around the tank but may be made larger to include cabinet or drawer space, and to conform to the size of other equipment in the kitchen or utility room.

The tank 10 is supported upon a hollow base member or pedestal 13 which may be supported on stepped adjusting wedges 14 to level the top of the cabinet. The bottom 15 of the tank 10 may be domed and is provided with a drain plug 16 in its center to enable the tank to be cleaned when required.

Near the top of the tank 10 is a closure disk 17 which is welded or otherwise secured in spaced relation to the upper end of the tank to form a compartment 18 for receiving the regeneration control valve 20 and a salt-loading tube 21 through which salt is introduced into the tank for regenerating the bed of water softening reagent, not shown, therein. Above the valve 20 is a partition plate 22 which conceals the valve and exposes only the upper portion of the tube 21. The partition plate 22 is removably mounted within the upper end of the tank and is retained frictionally therein by means of sealing rings 23 and 24 engaging the inner wall of the tank and the outside of the tube 21. The tube 21 is provided with a closure cap 25 which seals the end of the tube against leakage of water therefrom. The valve 20 is also provided with an adjusting knob 27 above the partition plate 22 to make it accessible to the householder for control of the regenerating and service cycle.

The filler cap 25 and the knob 27 are normally concealed by a cover or lid 28 which is hinged to the back of the cabinet 11 or directly to the upper edge of the tank 10, if desired. The cover 28 conceals the cap 25 and the knob 27 when the cover is closed and forms a working surface at the top of the cabinet. The lid 28 can be square in shape to fit over the top rim of the cabinet 11 or, as illustrated, it may be circular to fit tightly over the top of the tank 10 with suitable fillets 29 in the corners of the cabinet to complete a substantially flat and unobstructed upper work surface on the cabinet.

The water softening unit is provided with suitable connections for supplying raw water to the bed of water softening reagent, drawing off the softened water and supplying it to the service line of the house and suitable connections for providing a fluid circuit whereby the reagent in the unit may be regenerated.

Referring now to Fig. 4, the valve 20 has a coupling 30 to be connected to the raw water supply, a coupling 31 to be connected to the service line of the house and a coupling 32 to be connected to the drain or waste line of the house. The valve, to be described in greater detail hereinafter, is also connected by means of an elongated pipe 33 to a bottom water distributor 34 disposed near the bottom of the tank 10, a top water distributor 35 adjacent the closure 17 and above the bed of water softening reagent and a draw-off line 36 by means of which water can be withdrawn from the tank 10 to enable salt to be added to the water for regenerating the water softener. The top distributor 35 consists of a short length of pipe having a mitered lower end 37 and a deflector plate 38 fixed to its end to direct the water laterally to avoid channelling of the water softening reagent.

The valve 20 for controlling the water softening cycle and its various positions in the several stages of the cycle will now be described. As shown in Figs. 6 to 10, the valve includes a generally disk-like body portion 40 and a pair of disk-like end plates 41 and 42 above and below the portion 40. The end plates 41 and 42 and the body portion 40 may be secured together by means of a series of bolts 43 disposed around their peripheries. The end plate 42 has a flange 44 around its outer edge to enable it to be secured to the closure 17 of the water softener above the opening 45 in the closure over which the valve is located and through which the conduit 33, the top distributor 35 and the draw-off pipe 36 extend.

As shown in Figs. 4 and 6, the drain coupling 32 is connected at an angle to a conventional poppet valve 46 which is used to prevent leakage from the valve 20 to drain when the water softener is in service. The valve 46 is open during the backwashing, salting and regenerating stages of the regenerating cycle. Opening and closing of the valve 46 is accomplished by means of a push rod 47 mounted for axial movement in spaced apart bushings 48 and 49 carried by a bracket 50 mounted on the end plate 41 of the valve casing. The push rod 47 has a crossbar 51 threaded on its outer end which is connected to the outer end of the valve stem 52 of the valve 46. A locking nut 53 is also threaded on the outer end of the push rod 47 to hold the crossbar 51 in adjusted position. The inner end of the push rod 47 carries a follower roller 53 which engages in a cam groove 54 in a disk 55 fastened to the stem 56 on which the control knob 27 of the valve 20 is mounted. Rotation of the knob 27 and the stem 56 will cause endwise movement of the push rod 47 to close the valve 46 when the valve 20 is adjusted to place the water softener in service and to open the valve 46 in all other positions of the valve 20 and its control knob 27.

As shown in Figs. 6 to 10, the valve 20 has a rotary valve plug 60 fixed to the stem 56 and disposed in a cylindrical cavity 61 in the mid-portion of the valve body 40. While the valve member 60 is illustrated as cylindrical, it will be understood that it can be of the frusto-conical type, if desired.

Referring now to Figs. 7 to 10, it will be seen that the valve plug 60 has a pair of arcuate passages 61 and 62 therein on opposite sides of its center and out of direct communication with each other. The ends of the passages 61 and 62 are spaced about 90° apart. The passage 62 communicates also with a semi-circular passage 63 which extends through the bottom of the valve plug 60 and communicates with recess 64 in the end plate 44, as shown in Fig. 6. The recess 64 is out of communication with the passage 61 at all times. The inlet coupling 30 communicates with a passage 65 in the casing portion 40 which is directly connected with the recess 64, as shown in Figs. 7 to 10, so that fresh or raw water is supplied to the passage 62 in all positions of the valve plug 60.

The service coupling 31 is connected to an arcuate passage 66 in the casing portion 40 and has a port 67 communicating with the cylindrical cavity 61 in the valve.

Spaced about 90° clockwise from the port 67 is a port 68 which communicates with a passage 69 extending vertically through the valve casing. The passage 69 is connected to the top distributor 35 of the water softener.

Spaced clockwise about 90° from the port 68 is a group of ports or passages 70 which communicate with the drain coupling 32 through the valve 46.

Spaced clockwise from the passages 70 is another port 71 which is connected with a passage 72 communicating with the bottom distributor conduit 33.

The draw-off pipe 36 of the water softener is connected to a passage 73 in the lower portion of the casing, as viewed in Fig. 7. The passage 73 has a lateral extension 73a forming an enlargement in a transverse passage 74 extending through one end of the valve casing. The passage 74 has its opposite ends closed by means of the screw plugs 75 and 76. At the left-hand end of the passage 74 is an angularly inclined passage 77 which extends into communication with the valve receiving opening 61 at its inner end. The passage 77 is connected to an ejector nozzle 78 having its tip positioned in the lateral extension 73a of the passage 73. The ejector directs water through a tapered section 74a of the passage and by means of an inwardly inclined passage 79 at its right-hand end down to the recess 61 in the valve casing.

The structure of the water softener having been described, the operation of the system during a regenerating cycle and in service will now be described.

Fig. 7 shows the position of the valve plug 60 when the water softener is in service for softening raw water introduced through the coupling 30 and supplying softened water to the household water system. The water flows through the coupling 30, the passage 65, through the recess 64 into the cross passage 62 of the valve plug. In this position of the valve plug 61, the valve 46 is closed so that water cannot flow out from the passage 62 through the ports 70 to the waste or drain coupling 32. Water does flow through the port 68, the passage 69 to the top distributor 35 and flows down through the bed of water softening reagent. The softened water enters the bottom distributor 34, flows upwardly through the conduit 33, the passage 72 (Fig. 7) in the valve body, the passage 61 in the valve plug 60 through the port 67, the passage 66 to the service coupling 31 and thence into a service line of the house.

When the water softening reagent is to be back-washed, the valve plug 60 is rotated to the position shown in Fig. 8. In this position, the valve 46 is opened by the cam disk 55 on the valve stem so that water flows in through the raw water coupling 30, the passage 65 into the recess 64, the passages 63 and 62 to the outlet or service coupling 31 so that water is still supplied to the house system. Raw water also flows through the port 71, the passage 72 to the bottom distributor 34, flows upwardly through the bed of reagent out through the top distributor 35, the passage 69, the port 68, the passage 61 in the valve plug 60 through one passage 70 to the valve 46 and to discharge.

At the conclusion of the backwashing operation, it is necessary to draw off water from the tank 10 to enable salt to be admitted to the tank through the salt tube 21. Inasmuch as the water softener has its control valve at the top and cannot drain by gravity, the ejector 78 is used to draw off the water. To accomplish this operation, the valve plug 60 is adjusted to the position shown in Fig. 9. In this position, the raw water flows through the inlet coupling 30, the passage 65, the recess 64 into the cross passage 62. Raw water is discharged from the passage 62 through the port 67, the passage 66 to the outlet coupling 31 thereby maintaining water in the service line of the house. Raw water is also discharged from the opposite end of the passage 62 through the ejector nozzle 78 into the cross passage 74 thereby creating a suction at the passage 73 which is connected to the draw-off line 36 so that water is withdrawn from the top of the tank and is discharged through the passage 79 at the right-hand end of the passage 74, through the passage 61 in the valve plug to the top passage 70 and through the drain line 32 to waste, the valve 46 being open in this position of the plug.

The closure cap 25 may then be removed from the salt filler tube and salt added thereto for regenerating the reagent.

After the salt has been added, the cap 25 is replaced on the salt filler tube and the valve 60 is adjusted to the position shown in Fig. 10. The valve 46 still remains open. Raw water then flows through the inlet coupling 30 to the passage 62 in the plug 60 and through one end of the passage to the service line 31. Raw water also flows through the opposite end of the passage 62 through the port 68 and the passage 69 to the top distributor 35. The brine produced from the salt percolates down through the bed of reagent regenerating it and flows out through the bottom distributor up through the conduit 33, the passage 72, the port 71 through the middle passage 70 and out through the drain coupling 32 to waste. At this time, the passage 77 is closed as is the passage 79 at the opposite end of the ejector system.

When regeneration of the water softener reagent is completed, the valve plug 60 is rotated to the position shown in Fig. 7 in which the softened water is again delivered to the service coupling 31.

In order to facilitate the adjustment of the valve 20 to the various positions required in the cycle, the cam disk 55 may be provided with a series of suitably spaced notches 80, 81, 82 and 83 around its edge, to receive a spring-pressed ball 84 mounted on the bracket 50 so as to retain the disk releasably in any of the four positions required in the regenerating cycle.

It will be understood that the valve described above will be provided with the necessary gaskets and seals to prevent leakage of the valve and that, if desired, suitable grease gun fittings and the like, may be included to assure easy operation of the valve.

The above described water softener unit has, in addition to its dual utility as a work surface and a water softening unit, the advantage that the valve and the salt filling tube are located at a convenient height for operation in the regenerating cycle. Thus, the complete regenerating cycle can be handled at waist or table top level which avoids the need for the householder to bend over or stretch or to lift in inconvenient positions.

The unit can be furnished in attractive colors to match other household appliances so that it may be used in conjunction with metal or wood cabinets, disk washers and the like, and will resemble and fit in with such other utilities to present a most attractive appearance.

It will be understood that the water softener is susceptible to considerable variation and that its shape and dimensions may be modified so as to make it suitable as either a corner unit or in a line of other appliances so as to take best advantage of the space available in the kitchen or utility room. Moreover, the system and arrangement of elements may be modified depending upon the requirements of the user and therefore the form of the invention described above should be considered as illustrative and not as limiting the scope of the following claims.

We claim:

1. A water softener comprising an upright tank to receive a bed of water-softening reagent, said tank having an end closure adjacent the upper end thereof and a cover for the upper end of said tank spaced from said end closure and at about table top height, a valve mounted on said end closure and having couplings for connection with a source of raw water, a service line, and a drain line, a bottom distributor adjacent to the bottom of the tank connected to the valve, a top distributor adjacent to and below the end closure of the tank and connected to the valve, a draw-off line connected to said valve and having a lower end disposed between the top and bottom distributors and above the bed of water-softening reagent, an operating member for adjusting said valve, said end closure having an opening therein for introducing salt into said tank, and a closure member for said opening, said valve and operating member therefor and said closure member being concealed when said cover is closed.

2. The water softener set forth in claim 1 in which said valve has a rotatable plug therein for connecting said top and bottom distributors selectively to said raw water, service and drain connection for backwashing and regenerating said reagent and delivering softened water to said service line, said plug having passages therein to supply raw water to said service line during backwashing and regeneration.

3. The water softener set forth in claim 1 in which said valve has a rotatable plug therein for connecting said top and bottom distributors selectively to said raw water, service and drain connections for backwashing and regenerating said reagent and delivering softened water to said service line, said plug having passages therein to supply raw water to said service line during backwashing and regeneration, and an ejector in said valve connected to said draw-off line and controlled by said rotary plug to withdraw water from said tank through said draw-off line to enable salt to be introduced into said tank.

4. The water softener set forth in claim 1, in which said valve includes passages connected to said couplings, said top and bottom distributors and said draw-off line, the passage connected to said draw-off line having an ejector therein, and a rotary valve plug adjustable to four positions for selectively backwashing said reagent, actuating said ejector to draw off water above said reagent through said draw-off line, regenerating said reagent and putting said softener into service.

5. A water softener comprising an upright tank to receive a bed of water-softening reagent, a bottom closure for said tank, a top closure for said tank, said top closure having an opening therein to admit salt into said tank, a removable closure member for said opening, a valve mounted on top of said top closure and having couplings for connection with a source of raw water, a drain line and a service line, a top distributor connected to said valve and having a lower end disposed in said tank above said bed, a bottom distributor connected to said valve in said tank and adjacent the bottom thereof, a draw-off line connected to said valve and having a lower end disposed above said bed of reagent, said valve having an adjustable valve member to selectively connect said couplings to said top and bottom distributors, and said draw-off line to backwash said reagent, draw off water from said tank to enable salt to be admitted through said opening into said tank to regenerate said reagent, and to soften raw water and discharge it to said service line, and a cover for the top of said tank movable between a position covering said valve and said closure member, and a position uncovering said valve and closure member.

6. The water softener set forth in claim 5, in which said cover is at about table top height and forms an unobstructed working surface.

References Cited in the file of this patent

UNITED STATES PATENTS

| 1,873,306 | DeVille | Aug. 23, 1932 |
| 1,929,405 | Bilde | Oct. 10, 1933 |
| 1,937,330 | Brice | Nov. 28, 1933 |
| 2,036,634 | Inch | Apr. 7, 1936 |
| 2,137,406 | Johnson | Nov. 22, 1938 |
| 2,372,640 | Adler | Apr. 3, 1945 |
| 2,435,366 | Riche | Feb. 3, 1948 |
| 2,462,154 | Barnes | Feb. 22, 1949 |